Aug. 28, 1962   J. H. DRILLICK   3,051,381
SENSING DEVICE

Filed March 10, 1958   4 Sheets-Sheet 1

INVENTOR.
JACOB H. DRILLICK
BY
*George V. Hall*
ATTORNEY.

Aug. 28, 1962   J. H. DRILLICK   3,051,381
SENSING DEVICE

Filed March 10, 1958   4 Sheets-Sheet 2

INVENTOR.
JACOB H. DRILLICK
BY
*George V. Hall*
ATTORNEY.

Aug. 28, 1962   J. H. DRILLICK   3,051,381
SENSING DEVICE

Filed March 10, 1958   4 Sheets-Sheet 3

INVENTOR.
JACOB H. DRILLICK
BY
George V. Hall
ATTORNEY.

Aug. 28, 1962

J. H. DRILLICK 3,051,381

SENSING DEVICE

Filed March 10, 1958

4 Sheets-Sheet 4

INVENTOR.
JACOB H. DRILLICK
BY
George V. Hall
ATTORNEY.

3,051,381
SENSING DEVICE

Jacob H. Drillick, Orange, N.J., assignor to Monroe Calculating Machine Company, Orange, N.J., a corporation of Delaware
Filed Mar. 10, 1958, Ser. No. 720,322
10 Claims. (Cl. 235—61.11)

This invention relates to sensing devices for perforated record material and particularly to a device for sensing perforated tape.

In prior art tape sensing devices, movement of sensing pins or feelers through the perforations in the tape is operable, directly or through connections, to close electrical contacts for circuits controlling apparatus into which the data corresponding to the tape perforations is entered. To insure positive contact closure, considerable force must be applied to the sensing pins in the sensing operation. This has caused undue wear and often mutilation of the tape when the perforations are not in exact registration with the sensing pins.

It is accordingly the principle object of the invention to provide a tape sensing device which is positive in operation and which minimizes wear and precludes mutilation of the tape.

Another object of the invention is to provide a tape sensing device having the advantages as above stated and also which has reasonably high speed operation.

With the above objects in view, the invention comprises a series of hit or miss members each of which is operable to close an electrical contact for the utility circuits. Each hit or miss member is controlled in its path of movement by a sensing pin which is urged by a relatively light force into engagement with the perforated tape. The hit or miss members therefore may be operated by a force sufficient to insure positive closure of the contacts while the sensing operation is effected by the relatively light force.

Figure 1:
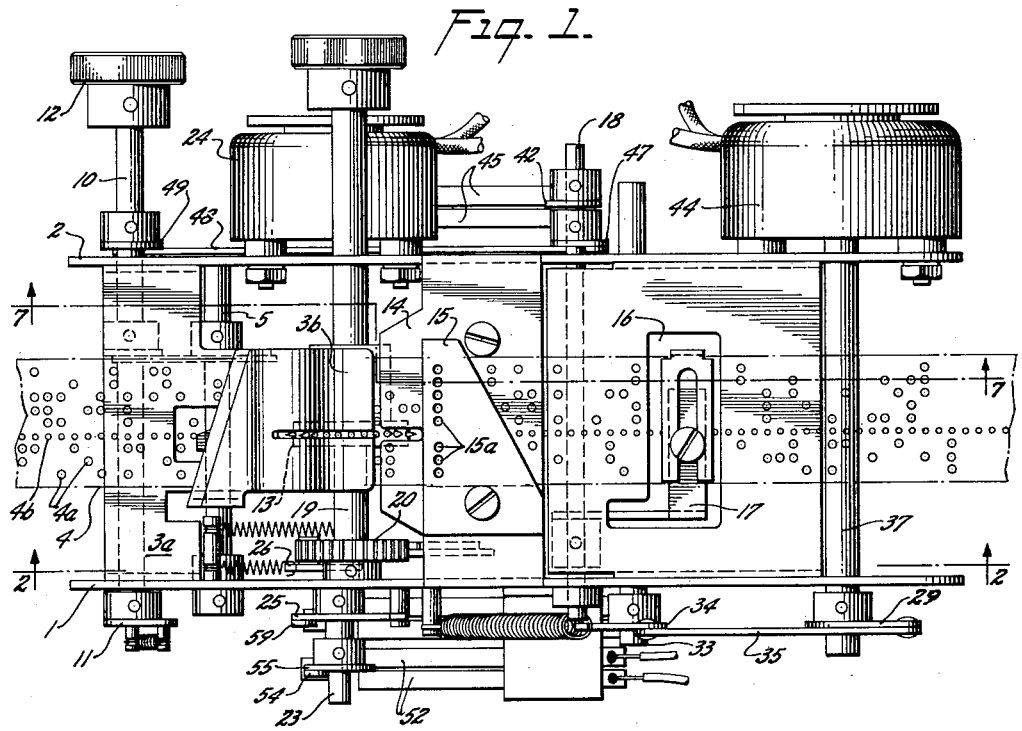
Figure 2:
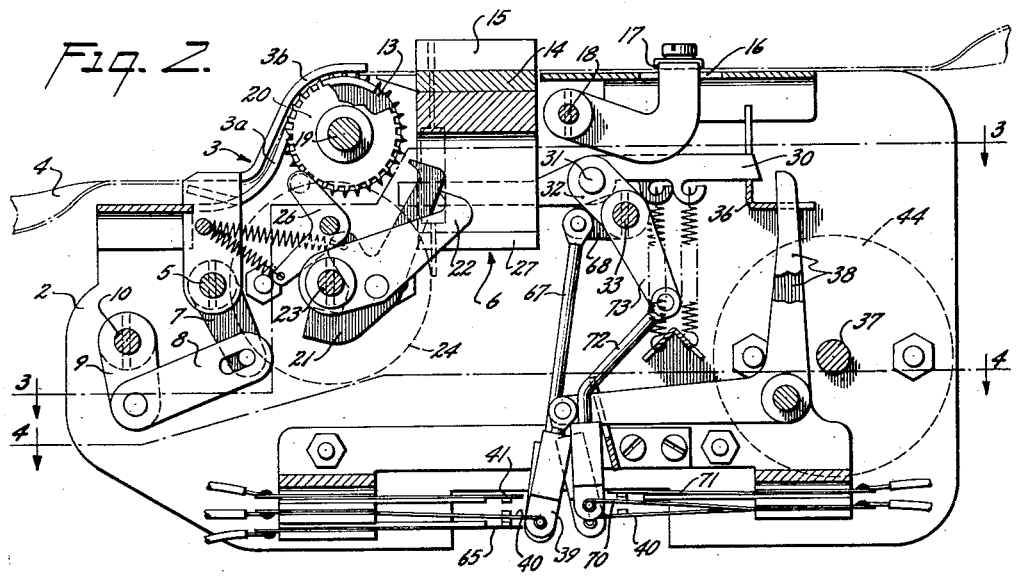
Figure 3:
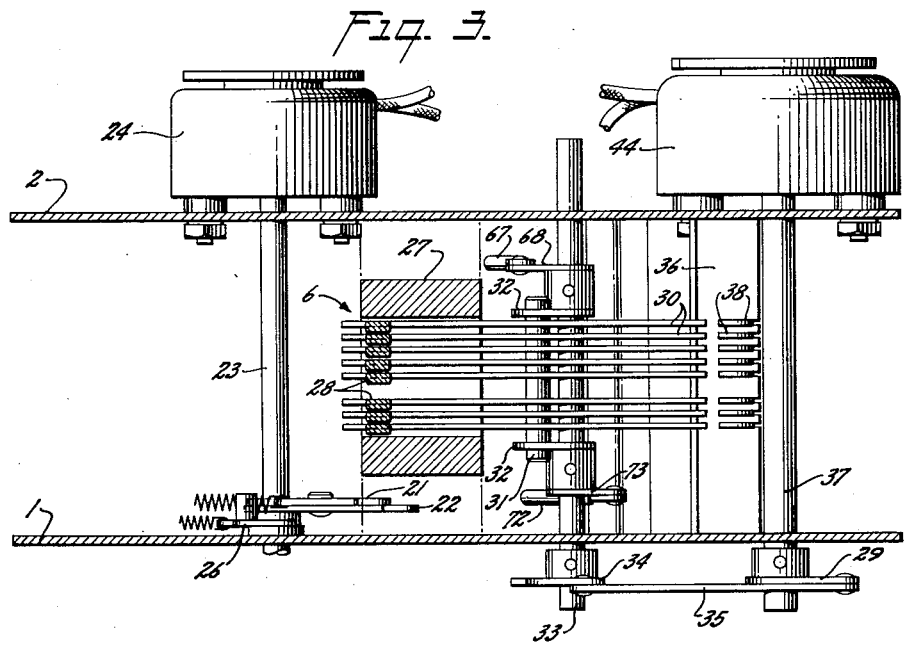
Figure 4:
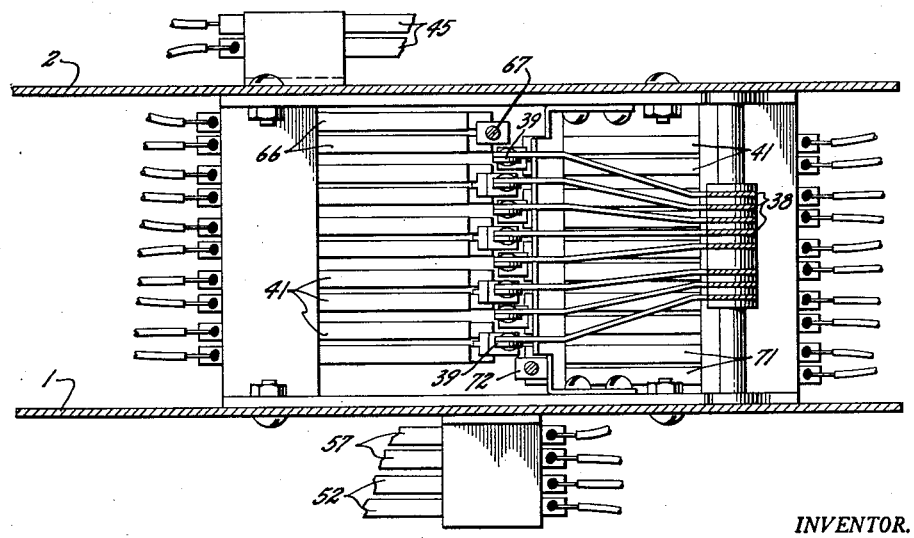
Figure 5:
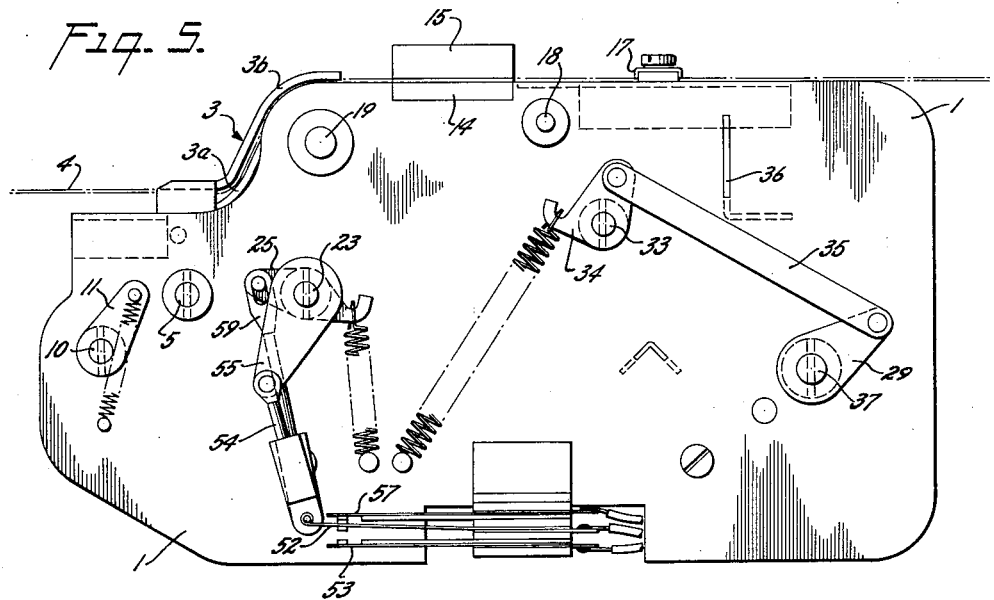
Figure 6:
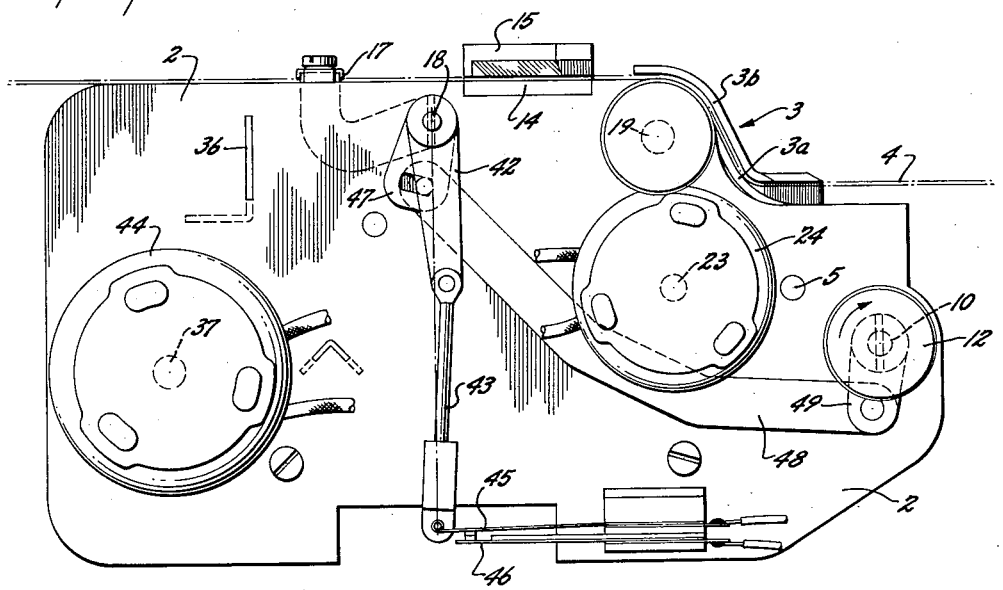
Figures 7, 7A, 8:
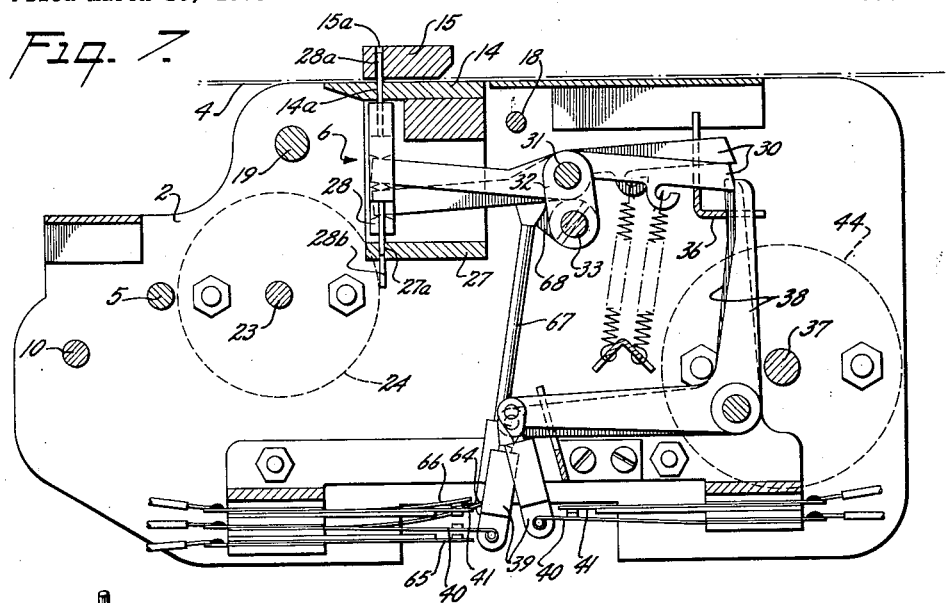

Transport means for the tape is correlative in its operation with the sensing means to achieve maximum overall speed of operation. The invention however will best be understood from the following description with reference to the accompanying drawings in which:

FIG. 1 is a top plan view of the sensing device.
FIG. 2 is a vertical section taken on line 2—2 of FIG. 1.
FIG. 3 is a horizontal section taken on line 3—3 of FIG. 2.
FIG. 4 is another horizontal section taken on line 4—4 of FIG. 2.
FIG. 5 is a right side elevation of the sensing device.
FIG. 6 is a left side elevation of the sensing device.
FIG. 7 is a vertical section taken on line 7—7 of FIG. 1.
FIG. 7A is a fragmentary perspective of one of the sensing units.
FIG. 8 is an electrical schematic of the operating circuitry.

The tape sensing device comprises a pair of side frames 1 and 2 (FIGS. 1, 3, 4). Mounted adjacent one end between side frames 1 and 2 is a throat 3 (FIGS. 2, 5, 6) through which the perforated tape 4 is passed as shown in dot-dash lines. Throat 3 comprises a fixed upwardly curved bottom plate 3*a* and an adjustable pressure plate 3*b* which follows the contour of plate 3*a* and which is resiliently urged toward engagement therewith.

Pressure plate 3*b* is fixed on a transverse shaft 5 (FIG. 2) which is rotatably mounted between side frames 1 and 2. A downwardly extending crank 7 is fixed on shaft 5 and has slot and pin connection at the right end of a leftwardly extending link 8. Link 8 has pivotal connection at its left end with a depending crank 9 which is fixed on a shaft 10 which is pivotally mounted between side frames 1 and 2. Shaft 10 extends outwardly through side frame 1 and has fixed thereon a crank 11 (FIGS. 1, 5) which is spring biased clockwise. Pressure plate 3*b* is therefore held in clockwise position toward engagement with plate 3*a* through the connections comprising crank 7, link 8 and crank 9 (FIG. 2).

Shaft 10 also extends outwardly through side frame 2 (FIGS. 1, 6) and has fixed thereon a knurled handle 12. Shaft 10 therefore may be manually rotated to rock pressure plate 3*b* to open throat position thereby permitting tape 4 to be passed over a sprocket wheel 13 which extends upwardly through a suitable slot in bottom plate 3*a* with its peripheral face flush with the upper face of the plate. Tape 4 is provided with a row of equally spaced feed holes 4*b* extending its length and which are engaged by the pins of sprocket wheel 13 fast on a transverse shaft 19. When pressure plate 3*b* is restored to closed throat position, the pins of sprocket wheel 13 will extend outwardly through a suitable slot in the plate.

After the tape has been passed over sprocket wheel 13, it is threaded through guide means comprising a bottom guide plate 14 (FIGS. 1, 2, 7) which is mounted between side frames 1 and 2 and an upper guide plate 15 which is secured on plate 14 and which is cut out on its underside to permit passage of said tape. After passage between guide plates 14 and 15, tape 4 passes above an opening 16 where it is engaged at its upper face by a transverse pressure finger 17 which is fixed on a rotatable cross shaft 18. When plate 3*b* is raised to permit passage of tape 4, shaft 18 will be rocked to raise finger 17, as later described, to permit passage of tape 4 thereunder.

Fast on the end of shaft 18, exteriorly of side frame 2 (FIGS. 1, 6), is a depending toggle link 42. A second toggle link 43 extends downwardly from link 42 and is connected at its lower end to a switch contact blade 45 which is resiliently biased upwardly. Normally shaft 18 is slightly counterclockwise beyond dead center with respect to link 43 as indicated by the dot-dash vertical line (FIG. 6). With the parts in this position, switch blade 45 will be held downwardly to engage a contact 46 which, as indicated in FIG. 8, is in the operating circuit of the sensing device. Therefore, if contact 45 is raised from engagement with contact 46, the sensing device will be rendered inoperative.

The upward urge of contact blade 45 tends to rotate shaft 18 counterclockwise (FIG. 6) through the connecting toggle links 42, 43. This presses finger 17 downwardly against the upper face of tape 4 above opening 16 when said finger is in normal lowered position. Consequently, if for any reason tape 4 should be broken, finger 17 will be moved downwardly through opening 16 by its connections with switch blade 45 which will move upwardly to break the circuit connection with contact 46 to stop the sensing operation hereinafter described.

The means for raising finger 17 when plate 3*b* is raised to open throat position to permit passage of tape 4 will now be described. Simultaneously with this operation contacts 45, 46 are opened to prevent operation of the sensing device. A depending crank 47 (FIG. 6) is fast on shaft 18 adjacent link 42 and has slot and pin connection with a rightwardly extending link 48 which is connected to a crank 49 fast on shaft 10. The slot and pin connection of crank 47 with link 48 permits movement of the parts independently of link 48 to effect the stopping operation upon breakage of the tape as previously described.

Upon clockwise rotation of handle 12 to raise plate 3*b* to open throat position, link 48 will be moved to the left by crank 49. The first part of this movement will be ineffective due to the slot and pin connection between crank 47 and link 48. However, upon further movement of link 48, crank 47 will be rocked clockwise thereby rotating shaft 18 and raising finger 17. Clockwise movement of shaft 18 will likewise rotate toggle link 42 and raise toggle link 43 thereby moving switch blade 45 upwardly from engagement with contact 46 to break the operating circuit.

Transversely aligned with sprocket holes 4b (FIG. 1) of tape 4 are tape perforations 4a representing the recorded data. Drive means for sprocket wheel 13 is adapted to step tape 4 to successively bring the lines of perforations 4a into registration with a reading head 6 (FIGS. 2, 7) later described.

The drive means for sprocket 13 comprises a ratchet wheel 20 (FIGS. 1, 2) fixed on shaft 19 and located by a click pawl 26. Ratchet wheel 20 is adapted to be engaged by a drive pawl 21 which is pivotally and yieldably mounted on an overthrow detent 22 which is fixed on a transverse shaft 23. Shaft 23 extends outwardly from side frame 2 and is there rotatably driven by the armature of a rotary transport solenoid 24. This solenoid may be of the well-known Ledex type.

Normally, shaft 23 is held clockwise (FIG. 5) by a spring urged crank 25 which is fixed on said shaft exteriorly of side frame 1. Upon operation of solenoid 24, as later described, shaft 23 will be rocked counterclockwise thereby engaging drive pawl 21 with a tooth of ratchet wheel 20 to rotate shaft 19 and sprocket 13 one step of movement. As the ratchet wheel 20 completes its step of movement, overthrow detent 22 will engage a tooth of ratchet wheel 20 to prevent overthrow of the parts. To provide for manual stepping operation of sprocket 13, a knurled handle is fixed on shaft 19 exteriorly of side frame 2 (FIG. 1).

Reading head 6 (FIGS. 2, 3, 7) comprises a housing 27 which is secured between side frame 1 and 2. Housing 27 includes a lower plate in which there is a series of transverse holes 27a corresponding to the maximum number of holes which may be punched in a transverse line of perforations of tape 4. In vertical alignment with holes 27a are holes 14a and 15a in guide plates 14 and 15 respectively.

A pair of vertically aligned pins 28a and 28b are fixed in the upper and lower ends respectively of each of a series of connectors 28 to form a sensing unit as best seen in FIG. 7A. Pins 28a slidably engage openings 14a respectively in plate 14 and pins 28b slidably engage the corresponding aligned openings 27a and casing 27. Normally the upper ends of pins 28a are slightly below the upper face of plate 14 thereby permitting passage of tape 4.

Each connector 28 is recessed at its left side face (FIG. 7A) intermediate its ends and is there engaged by the left end (FIGS. 2, 3, 7) of an actuating hit or miss lever 30. Levers 30 are fulcrumed on a transverse shaft 31, the ends of which are mounted at the upper ends of a pair of cranks 32 which are fixed on a transverse shaft 33 extending outwardly from the side frame 1 (FIG. 5) and which has fixed thereon a crank 34 which is spring urged counterclockwise. Thus cranks 32 are normally rocked from a vertical position to the counterclockwise position shown in FIG. 2.

Crank 34 has link connection 35 with a crank 29 which is fixed on the end of a transverse shaft 37. Shaft 37 extends outwardly from the side frame 2 (FIGS. 1, 3) and is rotatably driven by the armature of a rotary sensing solenoid 44 which may be of the well-known Ledex type as noted in connection with solenoid 24.

The right ends of levers 30 (FIGS. 2, 7) engage guide slots respectively in a comb 36 and each lever is urged clockwise by a relatively light spring to engage the bottom of its slot. When cranks 32 are in the normal counterclockwise position of FIG. 2 with levers 30 engaging the bottom of the slots of comb 36, connectors 28 are vertically lowered to locate the top of pins 28a immediately below the underface of tape 4. Upon each stepping operation of solenoid 24, a line of perforations 4a will be brought into registration with the upper ends of pins 28a. After this, solenoid 44 will be operated to rock shaft 37 and crank 29 clockwise (FIG. 5). This will move link 35 to the right likewise rocking crank 34, shaft 33 and cranks 32 clockwise.

Upon clockwise movement of cranks 32, shaft 31 will be operable to raise levers 30 at their centers from the position of FIG. 2 to the position of FIG. 7, and at the same time move them toward the right. The right end of each lever 30 is urged downwardly by its spring, and therefore as the center of the lever is raised, its left end will also be raised if the connected pin 28a is permitted upward movement through a perforation in tape 4. In this instance, the right end of lever 30 will remain lowered and engaged with the bottom of its slot in comb 36 as it is moved toward the right as shown by the front lever of FIG. 7. However, if there is no perforation 4a in registration with pin 28a, the left end of lever 30 will be restrained from upward movement as its center is raised upon clockwise movement of cranks 32. In this instance, the restraint of the left end of lever 30 from upward movement will cause said lever to be rocked counterclockwise thereby raising its right end as it is moved toward the right as shown by the rear lever of FIG. 7.

Associated with each hit or miss lever 30 is a crank 38. Each crank 38 has an upstanding arm, the end of which is in the path of movement of the right end of the associated lever 30 when said lever is moved toward the right with its right end in lowered position as shown by the front lever of FIG. 7. However, when a lever 30 is moved toward the right with its right end in raised position, it will pass idly above the upstanding arm of the related crank 38 as shown by the rear lever of FIG. 7. Thus it will be seen that if a pin 28a is permitted upward movement through a perforation in tape 4, the associated lever 30, upon rightward movement, will be operable to rock the related crank 38 clockwise; and if said pin 28a is restrained from upward movement, the right end of lever 30 will pass idly above the arm of crank 38.

Each crank 38 has a leftwardly extending arm which has link connection 39 with the end of a resilient switch contact blade 40. Normally, each switch blade 40 is resiliently biased downwardly, as shown in FIG. 2, thereby disengaging a contact 41 and holding the connected crank 38 counterclockwise. When a crank 38 is rocked clockwise by the related lever 30, the connected blade 40 will be moved upwardly to engage the related contact 41 thereby making a circuit connection for controlling apparatus (not shown) in accordance with the data corresponding to the tape perforation.

The operating circuitry for the tape sensing device includes a switch 50 and a switch 51 (FIG. 8) operated by transport solenoid 24. These may be appropriately termed early and late switches respectively. Early switch 50 is operated during the first part of the operating stroke of solenoid 24, and late switch 51 is operated during the terminal part of the stroke.

Early switch 50 comprises a switch blade 52 which is normally resiliently biased to disengage a contact member 53. The end of blade 52 has link connection 54 (FIG. 5) with a crank 55 which is fixed on shaft 23 exteriorly of side frame 1. During the first part of the counterclockwise movement of shaft 23 upon operation of solenoid 24, link 54 will be lowered thereby moving switch blade 52 to engage contact member 53.

Late switch 51 (FIG. 8) includes a switch blade 56 which normally is resiliently biased to engage a contact member 57 and to disengage a contact member 58. Switch blade 56 has connection (not shown) with the lower end of a link 59 (FIG. 5) which at its upper end has slot and pin connection with crank 25 which is fixed on shaft 23. During the first part of the rotary counterclockwise movement of shaft 23 upon operation of transport solenoid 24, crank 25 will be inoperative to move link 59 because of the slot and pin connection at its upper end. However, during the terminal part of the rotary movement of shaft 23, link 59 will be lowered thereby moving switch blade 56 to disengage contact 57 and engage contact 58.

As will be later described, operation of sensing solenoid 44 will immediately follow operation of transport solenoid 24. An early switch 61 and a late switch 62 (FIG. 8) are operated by sensing solenoid 44. Early switch 61 is operated during the first part of the operating stroke of solenoid 44 whereas late switch 62 is operated during the terminal part of the stroke.

Early switch 61 comprises a switch blade 64 which normally is resiliently biased to engage a contact 65 and to disengage a contact 66. Switch blade 64 has connection (not shown) with a link 67 (FIG. 2) which at its upper end is connected to a crank 68 fast on shaft 33. During the first part of the rotary clockwise movement of shaft 33 upon operation of solenoid 44, link 67 will be raised thereby moving switch blade 64 to disengage contact 65 and to engage contact 66.

Late switch 62 includes a switch blade 70 which normally is resiliently biased to engage a contact 71. Switch blade 70 has link connection 72 (FIG. 2) with a crank 73 which is fast on shaft 33. Crank 73 normally approaches a depending vertical position. Therefore upon clockwise rotation of shaft 33, crank 73 will be effective to lower link 72 at a very slow rate of speed. Consequently, switch blade 70 will not be moved sufficiently to disengage contact 71 until the terminal part of the movement.

Closure of a switch 75 (FIG. 8) provides for a single cycle operation of the tape sensing device whereas closure of a switch 76 provides for repeated cycles of operation. Switches 75, 76 may be manually operated or they may be operated by suitable well-known command controls from the apparatus receiving the data corresponding to the sensed tape perforations.

Transport solenoid 24 and sensing solenoid 44 are connected to one side of a suitable power source through leads 77, 79 respectively and through the previously described safety contacts 45, 46. Upon closure of switch 75, solenoid 24 will be connected to the other side of the line through a circuit comprising switch blade 70, contact 71, blade 56 and contact 57. During the first part of the stroke of solenoid 24, blade 52 will be moved to engage contact 53. This completes a circuit for solenoid 24 to insure its operation if switch 75 is open before the operation is complete. During the terminal part of the operating stroke of solenoid 24, switch blade 56 will be moved to disengage contact 57 and to engage contact 58. This will break the operating circuit for solenoid 24; however, said solenoid will remain in operated condition by a high resistance holding circuit comprising resistor 78, contact 71, switch blade 70, and switch 75, or contacts 52, 53 if switch 75 has opened.

Closure of contacts 56, 58 will complete an operating circuit for sensing solenoid 44 including contacts 70, 71 and switch 75, or contacts 52, 53 if switch 75 has opened.

During the first part of the operating stroke of sensing solenoid 44, contact 64 will be moved to engage contact 66. This will complete a high resistance holding circuit for solenoid 44 through resistor 80 and switch 75, or contacts 52, 53 if switch 75 has opened. As solenoid 44 completes its operating stroke, switch blade 70 will be moved to disengage contact 71. This will break the holding circuit for transport solenoid 24 which will drop out thereby moving switch blade 56 to disengage contact 58 and reengage contact 57 and moving switch blade 52 to disengage contact 53.

Upon disengagement of contacts 56, 58 the operating circuit for solenoid 44 will be broken. Furthermore, the holding circuit through contacts 52, 53 will be broken. Consequently, if switch 75 has been opened, solenoid 44 will drop out and switches 61, 62 will be normalized so that redepression of key 75 will initiate another cycle of operation of the tape sensing device. However, if switch 75 remains closed, solenoid 44 will remain in operating condition by the holding circuit including contacts 64, 66. Switch 75, therefore, must be first disengaged and then reengaged to initiate another cycle of operation.

Rectifier 82 is operable to prevent energization of solenoid 24 through contacts 56, 58 and the holding circuit for solenoid 44 when said solenoid 44 has operated to break the circuit for solenoid 24 by disengaging contacts 70, 71.

Upon closure of switch 76, the operating circuit for transport solenoid 24 will include contacts 64, 65 of early switch 61 of solenoid 44. Otherwise the circuit will be the same as previously described upon closure of switch 75. Upon operation of solenoid 24, the operating circuit completed for solenoid 44 will also include contacts 64, 65. Otherwise, this circuit also will be the same as previously described upon closure of switch 75.

During the first part of the operating stroke of solenoid 44, switch blade 64 will be moved to disengage contact 65 and engage contact 66, and during the latter part of the stroke, switch blade 70 will be moved to disengage contact 71. Disengagement of contacts 70, 71 will break the holding circuit for transport solenoid 24 and the operating circuit for sensing solenoid 44. Solenoid 24 therefore will immediately drop out. However, a holding circuit for solenoid 44 includes contacts 52, 53 and 64, 66. Solenoid 44, therefore, will not drop out until solenoid 24 has first dropped out and moved switch blade 52 to disengage contact 53 thereby breaking the holding circuit. When solenoid 44 has dropped out switches 61, 62 will be normalized and another operating cycle will be immediately initiated if switch 76 remains closed.

Although the sensing device is disclosed as sensing perforated tape, it will be apparent that the principles of operation thereof are equally adaptable for use in a device for sensing perforated cards or other perforated record material. The invention therefore is to be restricted only as necessitated by the spirit and scope of the appended claims.

I claim:

1. In a device for sensing perforated record material; a carrier operable in a given path of movement, a hit or miss member adjustably mounted on said carrier, resilient means for biasing said hit or miss member in a given direction on said carrier, a sensing pin operable upon operation of said carrier to engage a non-perforated area of said record material to restrain said hit or miss member in one adjusted position against the bias of said resilient means and operable upon operation of said carrier to enter a perforation in said record material to permit movement of said member to another adjusted position by said resilient means, and a member movable to control a contact element and located in the path of movement of said hit or miss member when in one of said adjusted positions upon operation of said carrier.

2. In a device for sensing perforated record material; an oscillatively operable carrier, a hit or miss lever fulcrumed on said carrier, resilient means for biasing said lever in a given rotary direction on said carrier, a sensing pin urged by said lever upon oscillation of said carrier into engagement with said record material and upon engagement of a non-perforated area thereof operable to restrain said lever in one position on said carrier or operable to enter a perforation thereof to permit said resilient means to rock said lever to another position on said carrier, and an operating member movable to control a contact element and located in the path of movement of said lever upon oscillation of said carrier when said lever is in one of said positions.

3. In a device for sensing perforated record material; an oscillatively operable carrier, a hit or miss layer fulcrumed on said carrier, resilient means for biasing said lever in a given rotary direction, a sensing pin engaged by one end of said lever and operable upon oscillation of said carrier to engage a non-perforated area of said record material thereby restraining said lever in one position on said carrier against the bias of said resilient means or operable upon oscillation of said carrier to enter a perforation in said record material thereby permitting said resilient means to rock said lever to another position on said carrier, and an operating member movable to control a contact element and located in the path of movement of the other end of said lever upon oscillation of said carrier when said lever is in one of said positions.

4. In a device for feeding and sensing perforated record tape; an oscillatively operable carrier, a series of hit or miss levers fulcrumed on said carrier, resilient means for biasing said levers in a given rotary direction, a sensing pin engaged by one end of each of said levers and adapted to engage a non-perforated area of said tape thereby restraining said lever in one position on said carrier against the bias of said resilient means or adapted to enter a perforation in said tape thereby permitting said resilient means to rock said lever to another position on said carrier, an operating member located in the path of movement of the other end of each of said levers upon oscillation of said carrier when said lever is in one of said positions and movable to control a contact element, a drive train including a sensing solenoid for oscillating said carrier, a drive train including a transport solenoid for advancing said tape to bring rows of perforations successively into position to be sensed by said pins, a first early switching means and a first late switching means sequentially operable upon operation of said transport solenoid, a second early switching means and a second late switching means sequentially operable upon operation of said sensing solenoid, an operating circuit for said transport solenoid including in series normally closed contacts of said first late switching means, normally closed contacts of said second late switching means and normally closed contacts of said second early switching means, a holding circuit for said transport solenoid including in series said normally closed contacts of said second late switching means and normally open contacts of said first early switching means, an operating circuit for said sensing solenoid including in series normally open contacts of said first late switching means, said normally closed contacts of said second late switching means and said normally open contacts of said first early switching means, and a holding circuit for said sensing solenoid including in series normally open contacts of said second early switching means and said normally open contacts of said first early switching means.

5. In a device for transporting and sensing perforated record tape; the combination of transport means, a solenoid for operating said transport means, sensing means, a solenoid for operating said sensing means, circuit means for said solenoids, and switching means operable upon operation of said solenoids to control said circuit means to effect continuous alternate operation of said solenoids.

6. In a device for transporting and sensing perforated record tape; the combination of transport means including a solenoid, sensing means including a solenoid, an operating circuit for said transport solenoid, a holding circuit for said transport solenoid, an operating circuit for said sensing solenoid, a holding circuit for said sensing solenoid, switching means operable upon operation of said transport solenoid to break the operating circuit for said transport solenoid, to make the operating circuit for said sensing solenoid and to make the holding circuit for said transport solenoid, and switching means operable upon operation of said sensing solenoid to make said holding circuit for said sensing solenoid, to break said holding circuit for said transport solenoid and to break said operating circuit for said sensing solenoid.

7. In a device for transporting and sensing perforated record tape; the combination with transport means including a solenoid and sensing means including a solenoid; of a first early switching means and a first late switching means sequentially operable upon operation of said transport solenoid, a second early switching means and a second late switching means sequentially operable upon operation of said sensing solenoid, an operating circuit for said transport solenoid including in series normally closed contacts of said first late switching means, normally closed contacts of said second late switching means and normally closed contacts of said second early switching means, a holding circuit for said transport solenoid including in series said normally closed contacts of said second late switching means and normally open contacts of said first early switching means, an operating circuit for said sensing solenoid including in series normally upon contacts of said first late switching means, said normally closed contacts of said second late switching means and said normally open contacts of said first early switching means, and a holding circuit for said sensing solenoid including in series normally open contacts of said second early switching means and said normally open contacts of said first early switching means.

8. In a device for transporting and sensing perforated record tape; the combination with transport means including a solenoid and sensing means including a solenoid; of a first early switching means and a first late switching means sequentially operable upon operation of said transport solenoid, a second early switching means and a second late switching means sequentially operable upon operation of said sensing solenoid, an operating circuit for said transport solenoid including in series normally closed contacts of said first late switching means, normally closed contacts of said second late switching means and an operating switch for closing said circuit, a holding circuit for said transport solenoid including in series said normally closed contacts of said second late switching means and normally open contacts of said first early switching means, an operating circuit for said sensing solenoid including in series normally open contacts of said first late switching means, said normally closed contacts of said second late switching means and said normally open contacts of said first early switching means, and a holding circuit for said sensing solenoid including in series normally open contacts of said second early switching means and said normally open contacts of said first early switching means.

9. In a device for transporting and sensing perforated record tape; the combination of transport means, independent drive means for said transport means, sensing means, independent drive means for said sensing means, means for initiating and terminating operation of each of said drive means, and means conjointly operable by the two said drive means for controlling said initiating and terminating means to effect continuous alternate operation of the two said drive means.

10. In a device for transporting and sensing perforated record tape; the combination of transport means, a solenoid for operating said transport means, sensing means, a solenoid for operating said sensing means, circuit means for said solenoids, and switching means operable by one of said solenoids upon energization thereof to control said circuit means to energize the other of said solenoids, operable by said other solenoid upon energization thereof to control said circuit means to deenergize said one solenoid, operable by said one solenoid upon deenergization thereof to control said circuit means to deenergize said other solenoid and operable by said other solenoid upon deenergization thereof to control said circuit means to energize said one solenoid.

References Cited in the file of this patent
UNITED STATES PATENTS

| | | |
|---|---|---|
| 2,490,346 | Furman | Dec. 6, 1949 |
| 2,614,632 | Clos | Oct. 21, 1952 |

UNITED STATES PATENT OFFICE
CERTIFICATE OF CORRECTION

Patent No. 3,051,381                      August 28, 1962

Jacob H. Drillick

It is hereby certified that error appears in the above numbered patent requiring correction and that the said Letters Patent should read as corrected below.

Column 3, line 10, for "perforfations" read -- perforations --; line 34, for "frame" read -- frames --; column 6, line 71, for "layer" read -- lever --; column 8, line 14, for "upon" read -- open --.

Signed and sealed this 3rd day of September 1963.

(SEAL)
Attest:

ERNEST W. SWIDER
Attesting Officer

DAVID L. LADD
Commissioner of Patents